United States Patent
MacNeille et al.

(10) Patent No.: US 10,575,152 B2
(45) Date of Patent: Feb. 25, 2020

(54) SYSTEM AND METHOD FOR CONTACTING OCCUPANTS OF A REMOTE VEHICLE USING DSRC

(71) Applicant: FORD GLOBAL TECHNOLOGIES, LLC, Dearborn, MI (US)

(72) Inventors: Perry Robinson MacNeille, Lathrup Village, MI (US); Dehua Cui, Northville, MI (US); Oleg Yurievitch Gusikhin, West Bloomfield, MI (US); David Allen Kowalski, Toledo, OH (US); Omar Makke, Lyon Township, MI (US); Cynthia M. Neubecker, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/744,535

(22) PCT Filed: Sep. 4, 2015

(86) PCT No.: PCT/US2015/048553
§ 371 (c)(1),
(2) Date: Jan. 12, 2018

(87) PCT Pub. No.: WO2017/039686
PCT Pub. Date: Mar. 9, 2017

(65) Prior Publication Data
US 2018/0262888 A1  Sep. 13, 2018

(51) Int. Cl.
*H04W 4/00* (2018.01)
*H04W 4/46* (2018.01)
(Continued)

(52) U.S. Cl.
CPC ............... *H04W 4/46* (2018.02); *H04L 67/16* (2013.01); *H04W 8/005* (2013.01); *H04W 8/18* (2013.01);
(Continued)

(58) Field of Classification Search
CPC ....... H04W 88/02; H04W 4/02; H04W 88/06; H04M 1/72519; H04M 1/72525;
(Continued)

(56) References Cited

U.S. PATENT DOCUMENTS 8,213,861 B2    7/2012  Tengler et al.
8,233,389 B2 *  7/2012  Yim ................... H04L 47/14
                                                       370/229
(Continued)

FOREIGN PATENT DOCUMENTS

RU    2511526 C2    4/2014

OTHER PUBLICATIONS

International Search Report for Application No. PCT/US2015/048553 dated Dec. 4, 2015.
(Continued)

*Primary Examiner* — Danh C Le
(74) *Attorney, Agent, or Firm* — Gregory P. Brown; Brooks Kushman P.C.

(57) ABSTRACT

A system for a vehicle includes a controller programmed to, in response to discovering, without an already established connection with a remote vehicle, a service broadcasted by the remote vehicle indicating that cellular communication with the remote vehicle is available, confirm that the service is a subscribed-to service, and upon receiving input to invoke the subscribed-to service, contact the remote vehicle using the subscribed-to service.

18 Claims, 7 Drawing Sheets

(51) Int. Cl.
  *H04W 8/18* (2009.01)
  *H04W 8/00* (2009.01)
  *H04L 29/08* (2006.01)
  *H04W 76/10* (2018.01)
  *H04W 4/80* (2018.01)
  *H04W 4/12* (2009.01)
  *H04W 16/20* (2009.01)

(52) U.S. Cl.
  CPC ............. *H04W 76/10* (2018.02); *H04L 67/10* (2013.01); *H04W 4/12* (2013.01); *H04W 4/80* (2018.02); *H04W 8/186* (2013.01); *H04W 16/20* (2013.01)

(58) Field of Classification Search
  CPC ........ H04H 20/00; H04H 20/62; H04H 60/00; H04H 60/08; B60R 25/102; B60R 2325/205; B60R 2325/304
  USPC ................... 455/422.1, 550.1, 418; 709/204; 340/426.2
  See application file for complete search history.

(56) References Cited

U.S. PATENT DOCUMENTS

| | | | |
|---|---|---|---|
| 8,280,583 B2 | 10/2012 | Stahlin et al. | |
| 8,843,553 B2 | 9/2014 | Christie et al. | |
| 8,965,695 B2 * | 2/2015 | Tzamaloukas | G01C 21/28 455/414.2 |
| 9,000,950 B2 | 4/2015 | Cannizzaro et al. | |
| 9,620,143 B2 * | 4/2017 | Tanaka | G10L 21/06 |
| 9,766,082 B2 * | 9/2017 | Koshizen | G01C 21/26 |
| 2007/0063824 A1 * | 3/2007 | Gaddy | G08G 1/096783 340/426.21 |
| 2007/0111672 A1 | 5/2007 | Saintoyant et al. | |
| 2009/0042518 A1 * | 2/2009 | Ido | B60R 25/2018 455/90.2 |
| 2011/0196969 A1 | 8/2011 | Tarte et al. | |
| 2012/0038489 A1 | 2/2012 | Goldshmidt | |
| 2012/0084364 A1 * | 4/2012 | Sivavakeesar | H04L 12/1818 709/205 |
| 2013/0325940 A1 * | 12/2013 | Foti | H04W 4/046 709/204 |
| 2014/0139354 A1 * | 5/2014 | Miyazaki | B60L 11/1816 340/902 |
| 2014/0207338 A1 | 7/2014 | Healey et al. | |
| 2014/0215491 A1 * | 7/2014 | Addepalli | H04W 4/046 719/313 |
| 2014/0302774 A1 | 10/2014 | Burke et al. | |
| 2015/0180849 A1 * | 6/2015 | Nesic | H04L 63/0815 726/6 |
| 2015/0264023 A1 * | 9/2015 | Reno | H04L 63/08 726/7 |
| 2016/0189543 A1 * | 6/2016 | Altintas | H04W 4/90 340/905 |
| 2017/0111122 A1 * | 4/2017 | Shimizu | H04W 4/027 |
| 2017/0245197 A1 * | 8/2017 | Onishi | H04W 4/046 |
| 2017/0332274 A1 * | 11/2017 | Link, II | H04W 76/11 |

OTHER PUBLICATIONS

Office Action of Russian application No. 2018107692/08 dated Mar. 11, 2019, 6 pages.

* cited by examiner

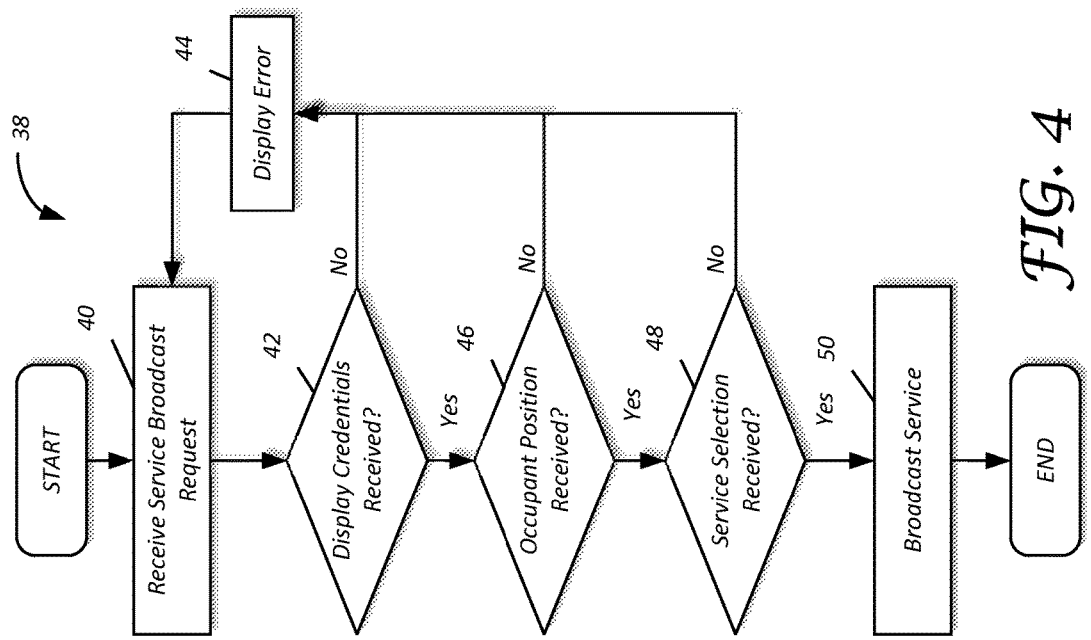
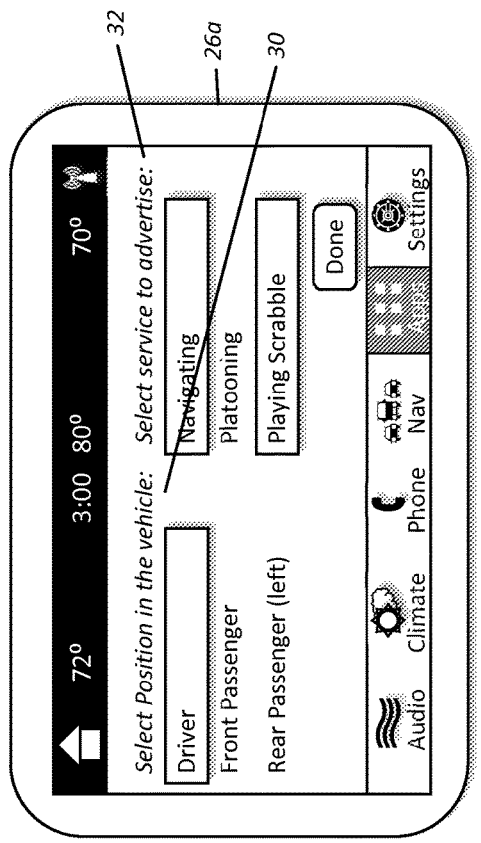
FIG. 3A
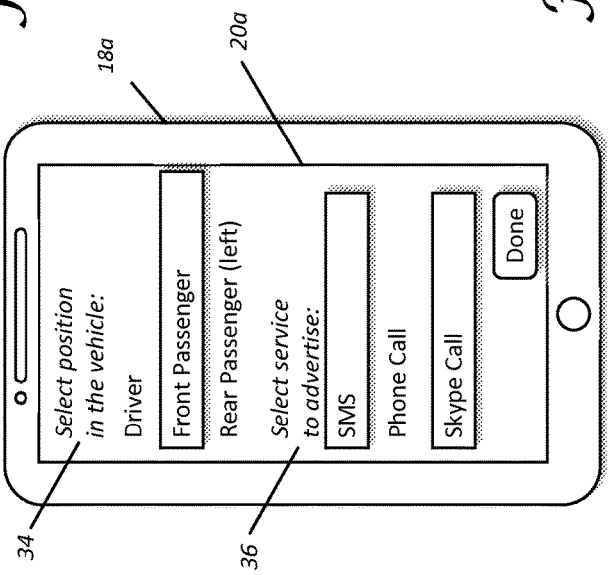
FIG. 3B
FIG. 4

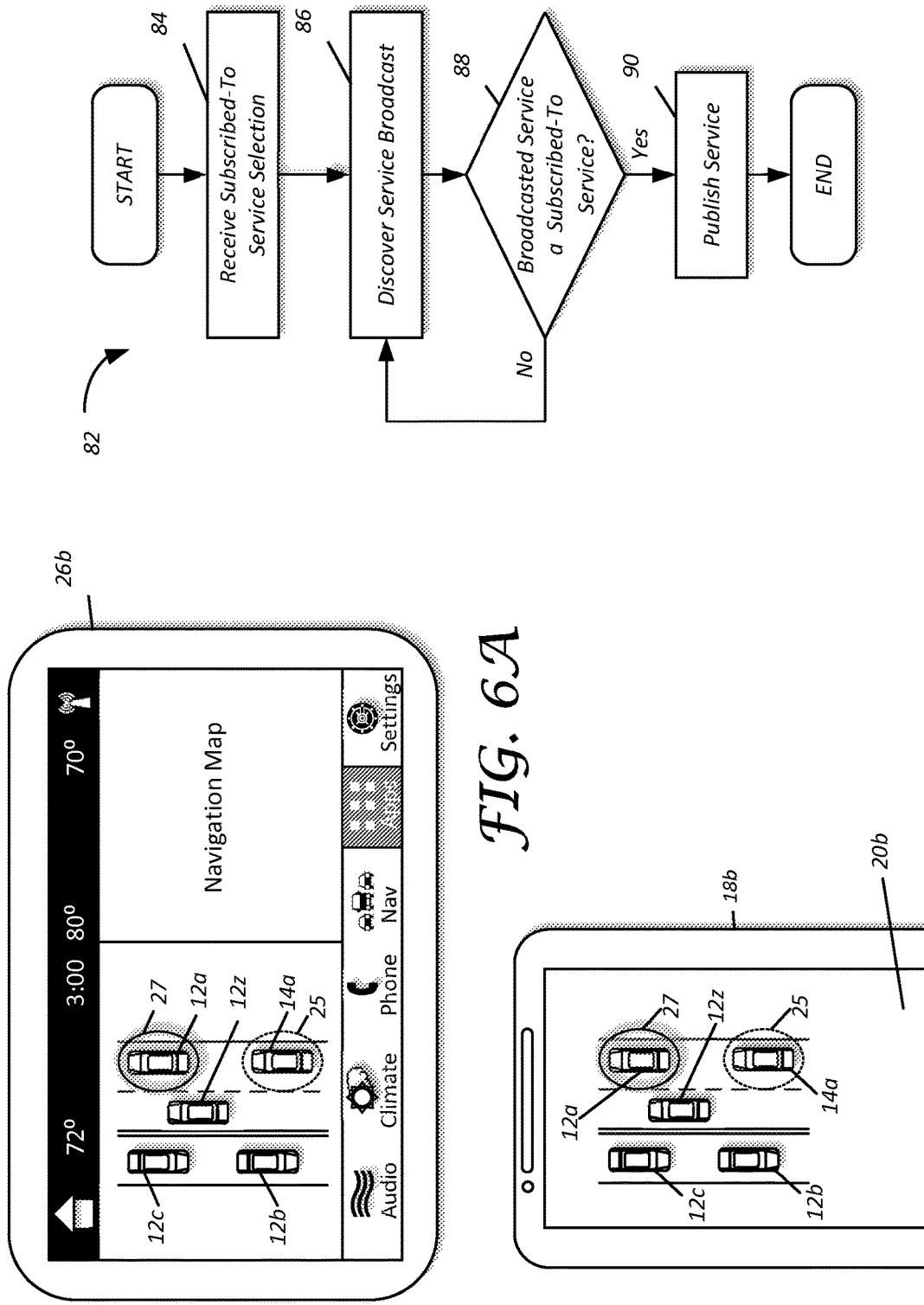

SYSTEM AND METHOD FOR CONTACTING OCCUPANTS OF A REMOTE VEHICLE USING DSRC

CROSS-REFERENCE TO RELATED APPLICATION

This application is the U.S. national phase of PCT Application No. PCT/US2015/048553 filed on Sep. 4, 2015, the disclosures of which is incorporated in its entirety by reference herein.

TECHNICAL FIELD

The present disclosure relates to systems and methods for establishing communication with occupants of a nearby vehicle using a dedicated short-range communication (DSRC) system.

BACKGROUND

An occupant of one traveling vehicle may wish to connect to an occupant of a nearby vehicle whose phone number or other contact information they do not know. For example, a driver's view of the roadway signs may be limited by a second vehicle traveling in the same or a different lane and the driver may wish to call a person navigating the second vehicle to find out if a particular exit is coming up next and the distance to the exit. In another example, an occupant of one vehicle may wish to engage the occupants of nearby vehicles in an online game or a blog discussion. In still another example, a group of travelers in several tour buses traveling together may wish to have a conference call so a single tour guide may give a presentation to all the travelers.

SUMMARY

A communication system for a vehicle includes a controller programmed to, in response to discovering, without an already established connection with a remote vehicle, a service broadcasted by the remote vehicle indicating that cellular communication with the remote vehicle is available, confirm that the service is a subscribed-to service, and upon receiving input to invoke the subscribed-to service, contact the remote vehicle using the subscribed-to service.

A communication method for a vehicle includes, in response to discovering, without an already established connection with a remote vehicle, a service broadcasted by the remote vehicle indicating that cellular communication with the remote vehicle is available, confirming that the service is a subscribed-to service, and upon receiving input to invoke the subscribed-to service, contacting the remote vehicle using the subscribed-to service.

A communication system for a vehicle includes a controller programmed to discover, via a dedicated short-range communication (DSRC) network, a broadcasted service advertised by a remote vehicle indicating that cellular communication with the remote vehicle is available, confirm that the service is a subscribed-to service, and upon receiving input invoking the subscribed-to service, contact the remote vehicle using the subscribed-to service.

BRIEF DESCRIPTION OF THE DRAWINGS

FIGS. 3A-3B are block diagrams illustrating examples of a user interface in a broadcasting vehicle for selecting services to be advertised;

FIG. 4 is a flowchart illustrating an algorithm for receiving selected occupant position and services to be advertised by the broadcasting vehicle;

FIGS. 6A-6B are block diagrams illustrating examples of a user interface in a receiving vehicle for displaying one or more broadcasting vehicles;

FIG. 7 is a flowchart illustrating an algorithm for publishing a service selection according to a preferred service subscription;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
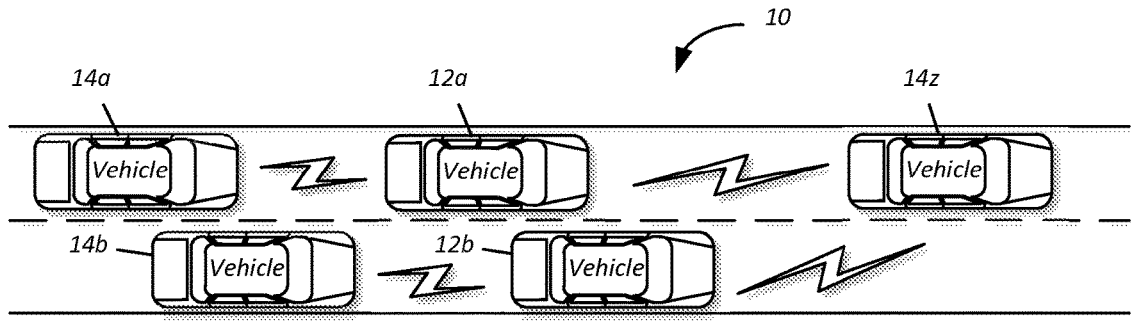
FIG. 1 is a block diagram illustrating a vehicle-to-vehicle (V2V) communication system using dedicated short-range communication (DSRC)

In reference to FIG. 1, a vehicle-to-vehicle (V2V) communication system 10 is shown. The V2V communication system 10 uses a DSRC network connection to enable communication between at least one occupant of a broadcasting vehicle 12 and at least one occupant of a receiving vehicle 14. While the broadcasting and the receiving vehicles 12, 14 as illustrated in FIG. 1 are specifically designated as such, any one of the vehicles 12, 14 may be a broadcasting vehicle when it is broadcasting services using the DSRC network and a receiving vehicle when it is receiving services using the DSRC network.

The DSRC network uses one-way or two-way short- to medium-range wireless communication channels specifically designed for automotive use and a corresponding set of protocols and standards. The DSRC and its wireless component, wireless access in vehicular environments (WAVE) protocol, operate within the allocated 75-megahertz (MHz)-bandwidth of the 5.9 gigahertz (GHz) frequency spectrum band. The allocated bandwidth is divided into one control channel (CCH) used to broadcast safety messages and announce available services and four to six service channels (SCHs) used for subsequent communication between the broadcasted service provider and a service user.

Messages between the broadcasting and the receiving vehicles 12, 14 may be delivered using at least two communication protocols—the Internet Protocol version 6 (IPv6) and WAVE short messages protocol (WSMP). The DSRC protocol's use of IPv6 is unique in that it does not rely on MAC or IP address to make a connection with a vehicle within its signal range. Instead, the DSRC connection enables the broadcasting vehicle 12 to advertise at least one service identified by a unique provider service identifier (PSID) without first establishing a connection with the receiving vehicle 14. These aspects will be discussed in further detail at least in reference to FIGS. 5-6, 8, 9-10, and 12.

Figure 2:
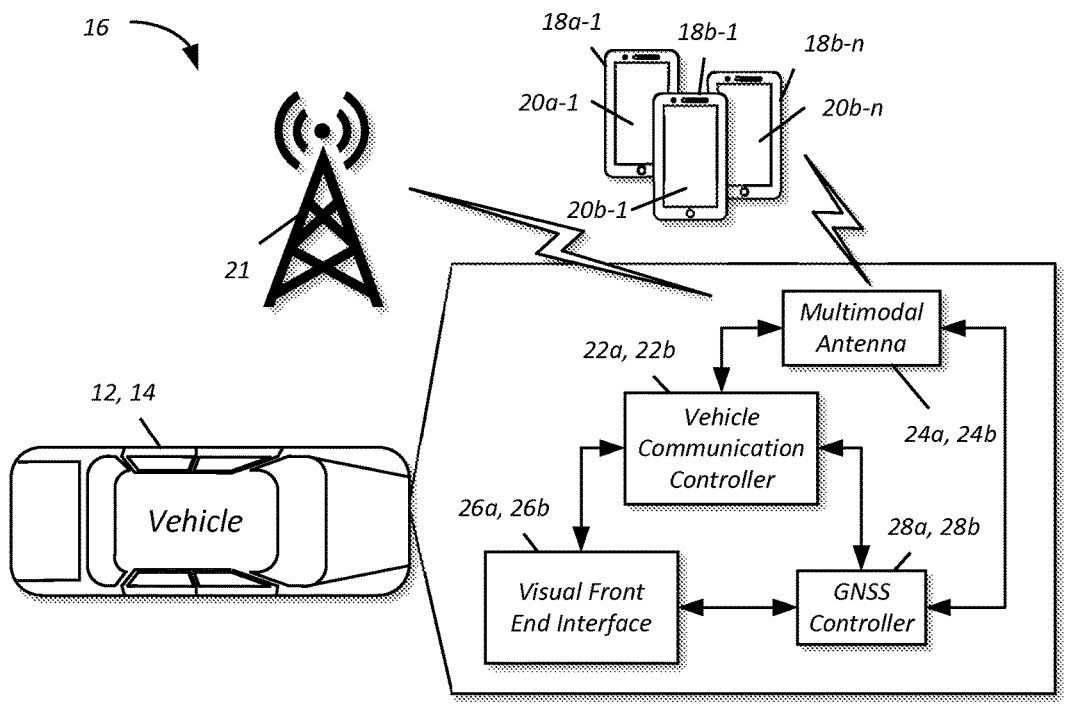
FIG. 2 is a block diagram illustrating a broadcasting vehicle and a receiving vehicle equipped with a V2V communication system using DSRC.

In reference to FIG. 2, an example configuration 16 of the broadcasting vehicle 12 and the receiving vehicle 14 configured to communicate using the DSRC network connection is shown. The broadcasting and the receiving vehicles 12, 14 may include vehicle communication controllers 22a, 22b (hereinafter controllers 22a, 22b), respectively. The broadcasting and the receiving vehicles 12, 14 may each further include a multimodal antenna 24, a visual front end interface 26, and a global navigation satellite system (GNSS) controller 28.

In one example, the controllers 22a, 22b may be implemented as one or more controllers together constituting a telematics system, such as, for example, the SYNC® system offered by Ford Motor Company. Although not shown, numerous vehicle components and auxiliary components in communication with the telematics system may use a vehicle network (such as, but not limited to, a CAN bus) to pass data to and from the telematics system (or components thereof). The controllers 22a, 22b may be in communication with a wireless network infrastructure 21, such as, but not limited to, cellular, WLAN, WiMAX, and so on.

As will be explained in further detail, using the DSRC connection, the controller 22a of the broadcasting vehicle 12 in cooperation with the multimodal antenna 24a is configured to receive and broadcast an occupant position selection and a service selection. As will also be explained in further detail, using the DSRC connection, the controller 22b of the receiving vehicle 14 in cooperation with the multimodal antenna 24b is configured to receive a preferred service selection and to accept the broadcasted occupant position and service selections according to the received subscribed-to, e.g., preferred, service selection. The controller 22b is further configured to contact the controller 22a of the broadcasting vehicle 12 using the broadcasted service that has been subscribed to.

The controllers 22a, 22b are in communication with the visual front end interfaces 26a, 26b, respectively, (hereinafter interfaces 26a, 26b), such as a built-in vehicle navigation display. The interfaces 26a, 26b may be configured to accept a user input via, for example, a touch sensitive screen. In another illustrative embodiment, the interfaces 26a, 26b may be configured to accept input through, among other means, button presses, gestures, audible speech, and speech synthesis.

The interface 26a of the broadcasting vehicle 12 is configured to accept user occupant position and service selection and to transmit the selection to the controller 22a for broadcasting using the DSRC network connection to the one or more receiving vehicles 14.

The interface 26b of the receiving vehicle 14 is configured to accept user preferred service selection and transmit the selection to the controller 22b for using in confirming that the broadcasted service is a subscribed-to service, e.g., a service listed in the user preferred service selection. In one example, the controller 22b is configured to confirm that the broadcasted service is a subscribed-to service using the unique PSID associated with the broadcasted service. The interface 26b is further configured to receive and to transmit user command to invoke the subscribed-to broadcasted service to contact the broadcasting vehicle 12.

The controllers 22a, 22b may further be in communication with one or more personal communication devices (PCDs) 18a, 18b, respectively, using an in-vehicle wired or wireless network. An example of such a connection is SYNC® AppLink™ system offered by Ford Motor Company. The controllers 22a, 22b may be configured to electronically map the screens of various software applications located on the connected PCDs 18 to the interfaces 26a, 26b, respectively. The controllers 22a, 22b may be further configured to enable vehicle occupant to control the mapped software application using touch, button input, voice or gesture commands, or a combination thereof.

The PCD 18 may be implemented as a mobile phone, tablet, laptop, wearable computer, and so on. As will be discussed in detail in reference to FIGS. 3B and 7B, the PCD 18 may include a PCD interface 20, such as a touch screen, a button selector, and so on, for receiving a user input.

The PCD 18a in communication with the broadcasting vehicle 12 is configured to receive user occupant position and service selection via the PCD interface 20a and to transmit the selection to the controller 22a for broadcasting using the DSRC network to the one or more receiving vehicles 14.

The PCD 18b in communication with the receiving vehicle 14 is configured to receive user preferred service selection (or subscribed-to service selection) via the PCD interface 20b and transmit the selection to the controller 22b for using in accepting the broadcasted services advertised via the DSRC connection. The PCD 18b is further configured to receive user input selecting the broadcasting vehicle 12 to be contacted using a particular subscribed-to service and contacting the selected broadcasting vehicle 12 using the selected subscribed-to service. Thus, one or more PCDs 18b in communication with the controller 22b of the receiving vehicle 14 may be able to connect to one or more PCDs 18a connected to the controller 22a of the broadcasting vehicle 12.

The controllers 22a, 22b are further configured to receive electronic signals from one or more vehicle controllers, such as, but not limited to, the GNSS controllers 28a, 28b, respectively. The GNSS controllers 28a, 28b each in respective connection with a GNSS transceiver (not shown) and the multimodal antennas 24a, 24b may be configured to monitor a geographic position of the broadcasting and the receiving vehicles 12, 14. The GNSS controllers 28a, 28b may be further configured to provide navigational guidance using, for example, voice commands, the respective interfaces 26a, 26b, or a combination thereof.

In reference to FIGS. 3A-3B, examples of user interface of the broadcasting vehicle 12 are shown. As shown in FIG. 3A the broadcasting vehicle 12 is equipped with the in-vehicle visual interface 26a. The interface 26a is configured to display occupant position menu choices 30 and advertised service menu choices 32. As described previously in reference to FIG. 2, the interface 26a is further configured to accept a user input regarding the displayed content via, for example, a touch sensitive screen. In one example, the interface 26a may be configured to accept a user input pertaining to occupant position menu choices, such as, but not limited to, driver, front passenger, left rear passenger, and so on.

In another example, the interface 26a may be configured to accept a user input pertaining to service selection menu choices, such as, but not limited to, navigating, platooning, participating in online gaming, receiving messages using short message service (SMS), multimedia messaging service (MMS), web-based messaging service, or email, receiving cellular phone calls, or calls using voice over IP (VoIP), and so on. In still another example, available service selection menu choices may vary based on a selection made within an occupant position menu and vice versa.

While the interface 26a as shown in FIG. 3A is configured to display and accept user input pertaining to occupant position and service selection menu choices, other menus and selections, such as, but not limited to, display credentials, e.g., username, pseudonym, and so on, broadcasting vehicle type, broadcast range, receiving vehicle type, and so on, are also contemplated.

The interface 26a is configured to transmit the occupant position and service selection to the controller 22a for broadcasting using the DSRC network to the one or more receiving vehicles 14. In one example, the interface 26a may be configured to transmit selections made in other menus, such as, but not limited to, menu selections pertaining to display credentials, broadcasting vehicle type, and so on.

Shown in FIG. 3B is the PCD 18a equipped with the PCD interface 20a configured to display occupant position menu choices 34 and advertised service menu choices 36. As described previously the PCD 18a may be connected to the controller 22a of the broadcasting vehicle 12 via an in-vehicle wired or wireless network, such as a wireless network managed by Ford Motor Company's SYNC® AppLink™ system.

The PCD interface 20a is further configured to accept a user input pertaining to the occupant position menu choices 34, such as, but not limited to, driver, front passenger, left rear passenger, and so on. The PCD interface 20a is also configured to accept a user input pertaining to the service selection menu choices 36, such as, but not limited to, navigating, platooning, participating in online gaming, receiving messages using SMS, MMS, web-based messaging service, or email, receiving cellular phone calls or calls using VoIP, and so on. In still another example, available service selection menu choices may vary based on a selection made within an occupant position menu and vice versa.

The PCD interface 20a as shown in FIG. 3B may be further configured to display and accept user input pertaining to other menus and selections, such as, but not limited to, display credentials, e.g., username, pseudonym, and so on, broadcasting vehicle type, broadcast range, receiving vehicle type, and so on.

The PCD interface 20a is configured to transmit the occupant position and service selection to the controller 22a for broadcasting using the DSRC network. In one example, the PCD interface 20a may be configured to transmit selections made in other menus, such as, but not limited to, menu selections pertaining to display credentials, broadcasting vehicle type, and so on.

In reference to FIG. 4, a control strategy 38 for receiving menu selections indicating occupant position and services to be advertised by the broadcasting vehicle 12 using the DSRC network. The control strategy 38 may begin at block 40 where the controller 22a detects a signal indicative of a request to advertise one or more selected services. In one example, the controller 22a receives the request to advertise one or more selected services in response to a user input using at least one of the interface 26a and the PCD interface 20a of the broadcasting vehicle 12.

At block 42 the controller 22a determines whether one or more user display credentials have been received. The display credentials may include, but are not limited to, a username or a pseudonym to be displayed on at least one of the interface 26b and PCD interface 20b of the receiving vehicle 14. The controller 22a displays an error at block 44 in response to determining that one or more user display credentials have not been received. The control strategy 38 may then return to block 40 where the controller 22a receives a signal indicative of a request to advertise one or more selected services.

The controller 22a at block 46 determines whether an occupant position selection has been received in response to determining at block 42 that one or more display credentials have been received. In one example, the controller 22a determines that the occupant position has been received in response to a user input using at least one of the interface 26a and the PCD interface 20a of the broadcasting vehicle 12. The occupant position selections include, but not limited to, a driver, front passenger, left rear passenger, right rear passenger, middle rear passenger, second row right passenger, and so on. The controller 22a displays an error at block 44 in response to determining that the occupant position selection has not been received. The control strategy 38 may then return to block 40 where the controller 22a receives a signal indicative of a request to advertise one or more selected services. In one example, in response to determining at block 46 that the occupant position selection has not been received, the controller 22a may assign a predetermined value to the selection, e.g., "Unknown Location" value, prior to proceeding to block 48.

At block 48 the controller 22a determines whether a service selection has been received in response to determining at block 46 that the occupant position selection has been received. In one example, the controller 22a determines that the service selection has been received in response to a user input using at least one of the interface 26a and the PCD interface 20a of the broadcasting vehicle 12. The service selection may include, but is not limited to, SMS, MMS, web-based messaging service, email, cellular phone call, VoIP, and so on.

The service selection may further include web-based interaction, such as, but not limited to, gaming, blogging, social networking, and so on. Still further, the service selection may include ability to accept requests for platooning, navigation, commercial services, e.g., repairs, towing, and emergency assistance, and so on. The controller 22a displays an error at block 44 in response to determining that the service selection has not been received. The control strategy 38 may then return to block 40 where the controller 22a receives a signal indicative of a request to advertise one or more selected services.

In one example, the controller 22a may be configured to check for selections received in response to user input using other menus and selections, such as, but not limited to, broadcasting vehicle type, broadcast range, broadcast power, receiving vehicle type, and so on. In another example, the controller 22a may be configured to check whether a selection has been made using any one menu, such as at least one of the service selection menus 32, 36.

At block 50 the controller 22a broadcasts the advertisement, e.g., a signal indicative of service selection, using the DSRC network and in response to determining at block 48 that the service selection has been received. In one example, the controller 22a may be configured to broadcast selections made using other menus and selections, such as, but not limited to, broadcasting vehicle type menu, broadcast range menu, broadcast power menu, receiving vehicle type menu, and so on. In another example, the controller 22a may be configured to broadcast the advertisement in response to a selection made using any one menu, such as at least one of the service selection menus 32, 36.

In one example, the controller 22a collects information pertaining to the broadcasting vehicle 12 and encrypts the collected information prior to broadcasting the service selection. This aspect of the disclosure will be discussed in further detail in reference to FIG. 5. At this point the control strategy 38 may end. In some embodiments the control strategy 38 described in FIG. 4 may be repeated in response to receiving a signal indicative of a request to advertise a service selection or in response to another signal or request.

Figure 5:
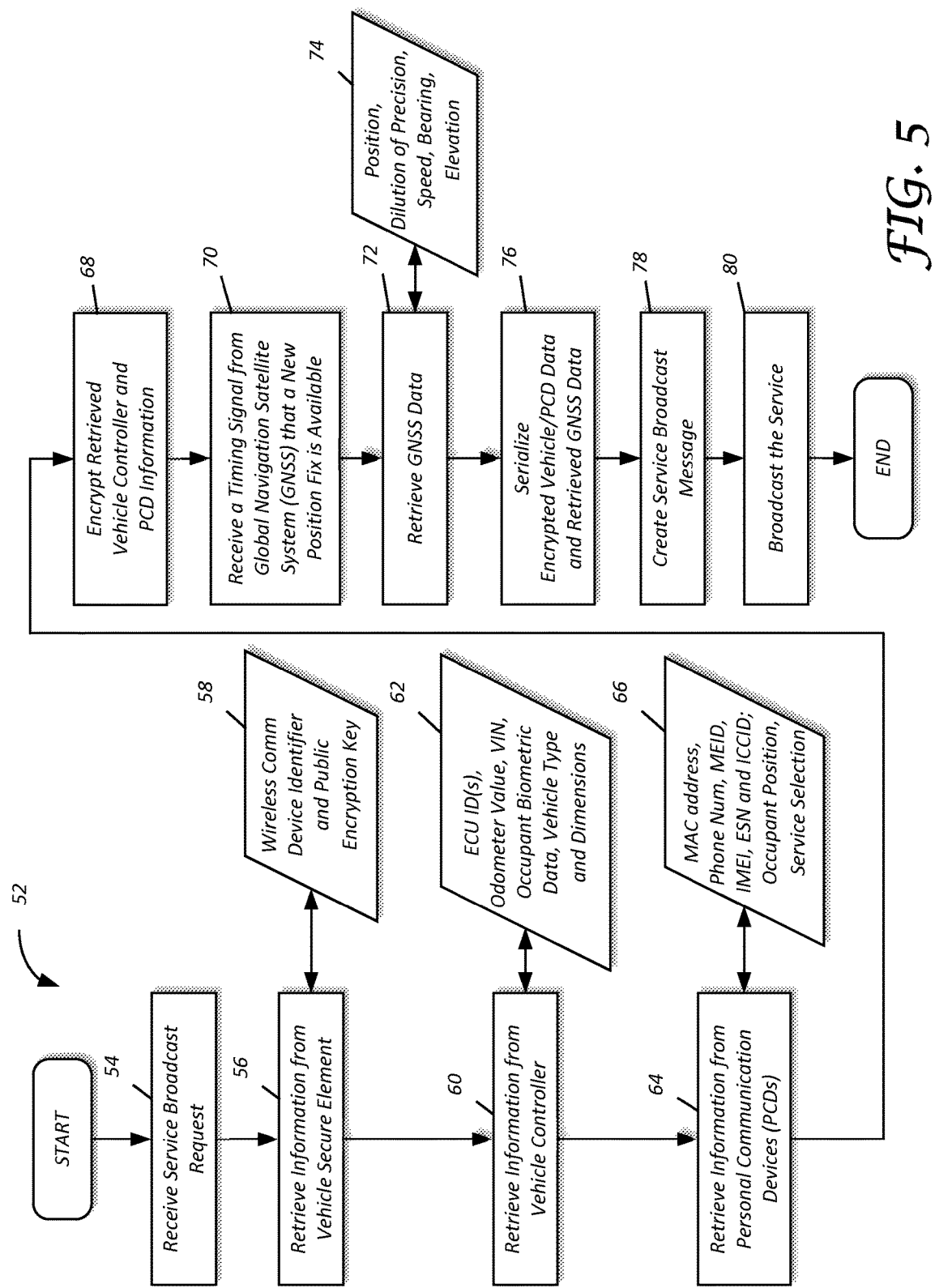
FIG. 5 is a flowchart illustrating an algorithm for encrypting and broadcasting an advertisement of selected services.

In reference to FIG. 5, a control strategy 52 for encrypting and broadcasting an advertisement is illustrated. The control strategy 52 may begin at block 54 where the controller 22a of the broadcasting vehicle 12 receives a service broadcast request. At block 56 the controller 22a retrieves information from a vehicle secure element. In one example, the vehicle secure element may be a vehicle controller (not shown) configured to identify and store information pertaining to a vehicle network, as shown at block 58, such as, but not limited to, a unique device identifier, public encryption key, etc.

At block 60 the controller 22a retrieves information from a vehicle electronic control unit (ECU). In one example, the ECU may be a vehicle controller configured to store various information pertinent to the broadcasting vehicle 12, as shown at block 62, such as, but not limited to, controller IDs of one or more vehicle controllers communicating using vehicle communication network, odometer value, vehicle identification number (VIN), occupant biometric data, current weather conditions, vehicle type and dimensions, and so on.

At block 64 the controller 22a retrieves information from one or more connected PCDs 18a. In one example, the controller 22a may retrieve device identifying information, as shown at block 66, such as, but not limited to, media access control (MAC) address, cellular phone number, mobile equipment identifier (MEID), international mobile station equipment identity (IMEI), electronic serial number (ESN), integrated circuit card ID (ICCID), and so on. In another example, the controller 22a may retrieve from one or more PCDs 18a information pertaining to service selection broadcast, such as, but not limited to, occupant position and occupant service selection.

At block 68 the controller 22a encrypts the retrieved information with a public encryption key. In one example, the controller 22a uses symmetric encryption, asymmetric encryption, or a combination thereof to encrypt the retrieved information.

At block 70 the controller 22a receives a timing signal from a global navigation satellite system (GNSS) indicating that a new position fix is available. In one example, the controller 22a may request the timing signal from an onboard global positioning system (GPS), such as the GNSS controller 28. At block 72 the controller 22a retrieves GNSS data. In one example, the controller 22a retrieves the GNSS data from the GNSS controller 28a, as shown at block 74, such as, but not limited to, vehicle geographic position, dilution of precision (DOP) value, vehicle speed, bearing to a next waypoint, elevation, and so on.

At block 76 the controller 22a serializes the encrypted vehicle and PCD data and the retrieved GNSS data. In one example, the controller 22a may form digitized signals from one or more vehicle controllers, the PCDs 18a, and the GNSS controller 28a into a serialized output signal for an over-the-air transmission using DSRC network. The controller 22a creates an advertisement broadcast message at block 78.

At block 80 the controller 22a sets a transmission power value and broadcasts the advertisement message using the DSRC network. In one example, the controller 22a may determine transmission power value $P_t$ using a path-loss channel model, a reception power value $P_r$, and message range R. At this point the control strategy 52 may end. In some embodiment the control strategy 52 as described in reference to FIG. 5 may be repeated in response to receiving a service broadcast request or in response to another notification or request.

In reference to FIGS. 6A-6B, examples of user interface of the receiving vehicle 14 for displaying one or more broadcasting vehicles 12 is shown. As shown in FIG. 6A, the interface 26b of the receiving vehicle 14 may be configured to display one or more broadcasting vehicles 12. The interface 26b may further be configured to display a home receiving vehicle 14a, i.e., the receiving vehicle 14 where the interface 26b is located, and to indicate the home receiving vehicle 14a (shown generally surrounded by a dashed oval outline 25) in reference to one or more broadcasting vehicles 12.

The interface 26b may also be configured to receive user input in selecting at least one broadcasting vehicle 12 to be contacted and to indicate a selected broadcasting vehicle 12a (shown generally surrounded by a solid oval outline 27). The interface 26b may also be configured to receive a user input via an audio system, e.g., audible speech, speech synthesis, and so on, in selecting at least one broadcasting vehicle 12 to be contacted and to indicate the selected broadcasting vehicle 12a in response to the received audio input.

As shown in FIG. 6B, the PCD interface 20b of the PCD 18b in communication with the receiving vehicle 14 may be configured to display one or more broadcasting vehicles 12. The PCD interface 20b may further be configured to display the home receiving vehicle 14a, i.e., the receiving vehicle 14 where the PCD 18b is located, and to indicate the home receiving vehicle 14a in reference to one or more broadcasting vehicles 12. The PCD interface 20b may also be configured to receive user input in selecting at least one broadcasting vehicle 12 to be contacted and to indicate the selected broadcasting vehicle 12a.

In reference to FIG. 7, a control strategy 82 for publishing a service selection according to a preferred service subscription is shown. The control strategy 82 may begin at block 84 where the controller 22b of the receiving vehicle 14 receives input indicating at least one subscribed-to service, i.e., a preferred service subscription selection. In one example, the controller 22b may receive the subscribed-to service selection in response to a user input using at least one of the interfaces 26b, 20b.

At block 86 the controller 22b discovers a service broadcast via the DSRC network, such as, for example, in response to the broadcasting vehicle 12 broadcasting an occupant position and/or a service selection via the DSRC network. At block 88 the controller 22b determines whether the discovered broadcasted service is a subscribed-to service. In one example, the controller 22b is configured to confirm that the broadcasted service is a subscribed-to service using the unique PSID associated with the broadcasted service. The control strategy 82 returns to block 86 where the controller 22b discovers a service broadcast in response to confirming that the discovered broadcasted service is not a subscribed-to service, e.g., does not match at least one service in the preferred service subscription.

At block 90, in response to confirming at block 88 that the discovered broadcasted service is a subscribed-to service, the controller 22b publishes the discovered broadcasted service, e.g., by transmitting a notification to the at least one of the interfaces 26b, 20b indicating that the subscribed-to service is available. At this point the control strategy 82 may end. In some embodiments the control strategy 82 may be repeated in response receiving a preferred service subscription selection or in response to another notification or request.

Figure 8:
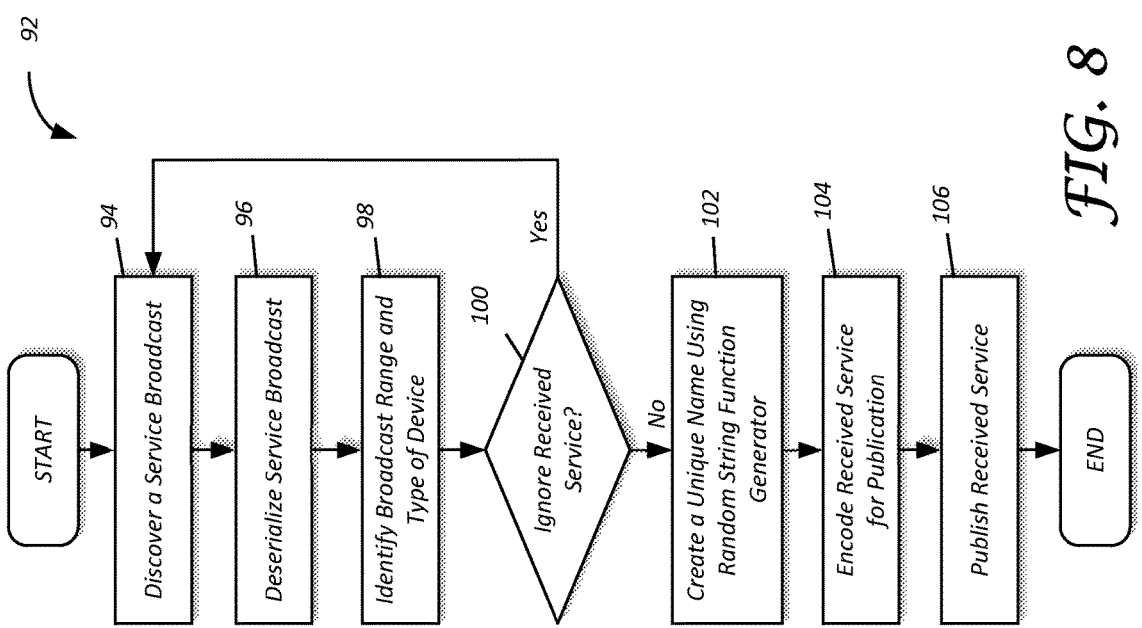
FIG. 8 is a flowchart illustrating an algorithm for processing a service broadcasted by one or more broadcasting vehicles using the DSRC network.

In reference to FIG. 8, a control strategy 92 for processing a broadcasted service advertised using the DSRC network is shown. The control strategy 92 may begin at block 94 where the controller 22b of the receiving vehicle 14 discovers a broadcasted service message advertised via the DSRC network. The controller 22b deserializes, or otherwise parses, the discovered broadcasted message at block 96.

At block 98 the controller 22b identifies a type of device that sent the advertisement and a signal range from which the device sent the broadcast. At block 100 the controller 22b of the receiving vehicle 14 determines whether to ignore the discovered service. In one example, the controller 22b may determine whether to ignore the discovered service by comparing the discovered service to subscribed-to services in a preferred service subscription selection, as described in reference to FIG. 7. The control strategy 92 returns to block 94 where the controller 22b discovers a broadcasted service message via the DSRC network in response to the controller 22b determining at block 100 that the discovered service should be ignored.

At block 102 the controller 22b creates a unique name using, for example, a random string function generator, in response to determining at block 100 that the discovered service should not be ignored, e.g., confirming that the discovered service is a subscribed-to service. At block 104 the controller 22b encodes, or otherwise designates, the discovered service for publication on at least one of the interfaces 26b, 20b. The controller 22b publishes the subscribed-to service, e.g., transmits the discovered subscribed-to service for display on the at least one of the interface 26b, 20b, at block 106. At this point the control strategy 92 may end. In some embodiments the control strategy 92 as shown in FIG. 8 may be repeated in response to discovering a broadcasted service message via the DSRC network or another message or request.

Figure 9:
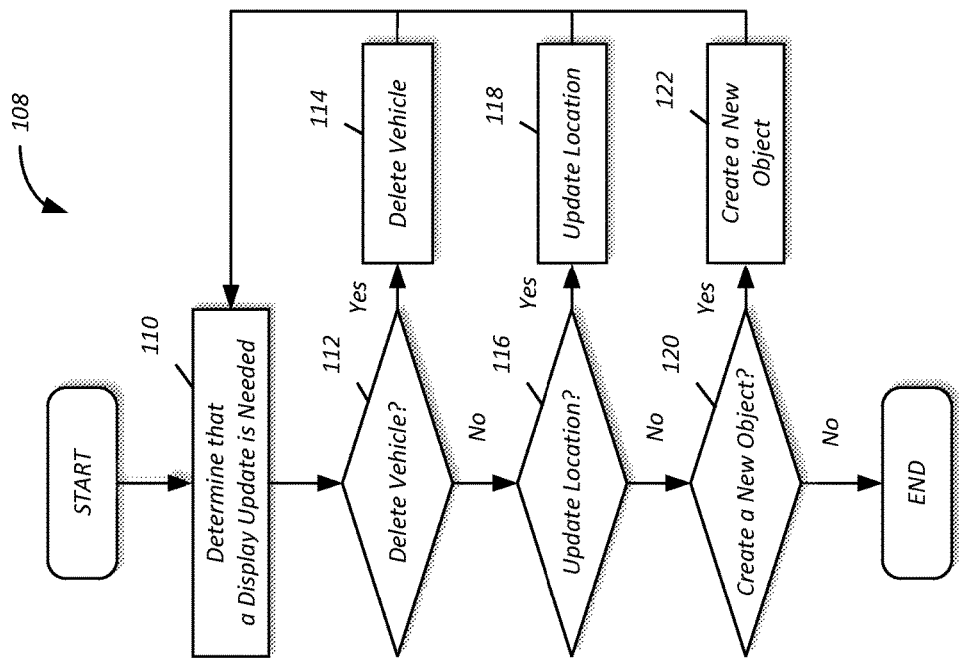
FIG. 9 is a flowchart illustrating an algorithm for updating a display of at least one interface in the receiving vehicle.

In reference to FIG. 9, a control strategy 108 for updating a display of at least one of the interface 26b and the PCD interface 20b of the receiving vehicle 14. The control strategy 108 may begin at block 110 where the controller 22b of the receiving vehicle 14 determines that an update needs to be made to a display of broadcasting and receiving vehicles depicted on at least one of the interface 26b and the PCD interface 20b. In one example, the controller 22b determines that an update is needed in response to discovering or stopping to discover the broadcasted service from at least one of the broadcasting vehicles 12.

In another example, the controller 22a of the broadcasting vehicle 12 may broadcast or stop broadcasting a service in response to determining that a change occurred in a relevant parameter, such as, but not limited to, a change of a geographic location of the broadcasting vehicle 12, a detection of one or more new broadcasting PCDs 18a, a change in occupant position of a currently connected PCD 18a, a change in broadcasted service selection of a currently connected PCD 18a, and so on.

At block 112 the controller 22b determines whether the update notification requires deleting at least one of the broadcasting vehicles 12 displayed on at least one of the interface 26b and the PCD interface 20b. In one example, the controller 22b may determine that at least one of the broadcasting vehicles 12 should be deleted in response to determining that the broadcasting vehicle 12 stopped broadcasting, that the broadcasting vehicle 12 is no longer within a signal range of the receiving vehicle 14, and so on.

The controller 22b at block 114 deletes at least one broadcasting vehicle 12 in response to determining at block 112 that, for example, the broadcasting vehicle 12 stopped broadcasting, that the broadcasting vehicle 12 is no longer within a signal range of the receiving vehicle 14, and so on. In one example, the controller 22b may transmit a notification to the at least one of the interfaces 26b, 20b indicating that at least one broadcasting vehicle should be deleted. The control strategy 108 may then return to block 110 where the controller 22b receives an update notification.

At block 116 the controller 22b determines whether a displayed position, i.e., geographic location, of at least one broadcasting vehicle 12 and receiving vehicle 14 depicted on at least one of the interface 26b and the PCD interface 20b should be updated. In one example, the controller 22b determines that the displayed position of one or more broadcasting vehicles 12 should be updated in response to receiving a notification indicating that geographic location of the one or more broadcasting vehicles 12 changed in reference to the receiving vehicle 14. In another example, the controller 22b determines that the displayed position of the receiving vehicle 14 should be updated in response to receiving a notification from the GNSS controller 28b indicating that the geographic position of the receiving vehicle 14 has changed.

The controller 22b at block 118 updates the displayed position of one or more broadcasting vehicles 12 in response to determining at block 116 that, for example, the displayed geographic location of one or more broadcasting vehicles 12 in reference to the receiving vehicle 14 has changed. The controller 22b at block 118 also updates the displayed position of the receiving vehicle 14 in response to determining, for example, that the displayed geographic position of the receiving vehicle 14 has changed. In one example, the controller 22b may transmit a notification to the at least one of the interfaces 26b, 20b indicating that the displayed position of the at least one broadcasting vehicle 12 and a receiving vehicle 14 should be updated. The control strategy 108 may then return to block 110 where the controller 22b receives an update notification.

At block 120 the controller 22b determines whether a new object should be created on a display of at least one of the interface 26b and the PCD interface 20b. For example, the controller 22b may determine that a new object should be created on the display in response to discovering a broadcasted service from the broadcasting vehicle 12 and confirming that it is a subscribed-to service. The controller 22b at block 122 creates a new object on the display of at least one of the interface 26b and the PCD interface 20b in response to, for example, confirming that the discovered broadcasted service from the broadcasting vehicle 12 is a subscribed-to service of the receiving vehicle 14.

In one example, the controller 22b transmits a notification to the at least one of the interfaces 26b, 20b indicating that a new object should be created. In another example, the notification to the interfaces 26b, 20b includes a geographic location of the new object in reference to the displayed broadcasting vehicles 12 and receiving vehicles 14. The control strategy 108 may then return to block 110 where the controller 22b receives an update notification.

The control strategy 108 may end in response to the controller 22b determining at block 120 that no new objects should be created on the display. In some embodiments, the control strategy 108 may be repeated in response to determining that display update is needed or in response to another request or notification.

Figure 10:
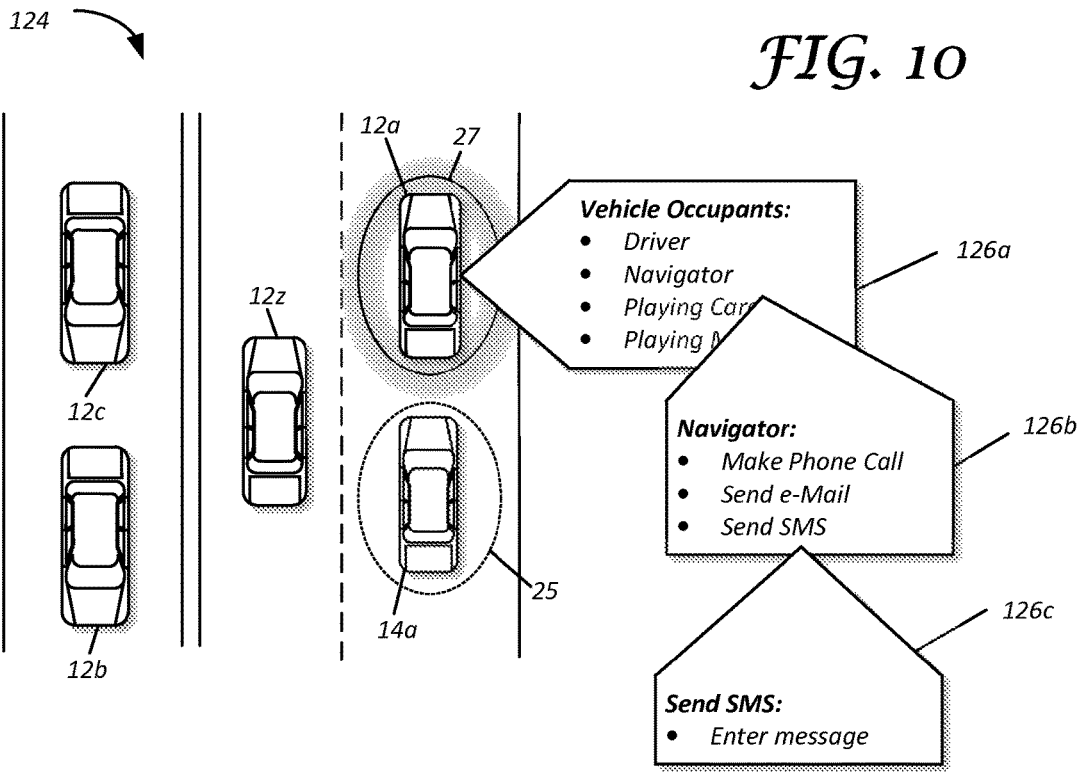
FIG. 10 is a block diagram illustrating an example user interface of a receiving vehicle for contacting a selected broadcasting vehicle using a subscribed-to service.

In reference to FIG. 10, an example interface 124 of at least one of the interface 26b and the PCD interface 20b of the receiving vehicle 14 is shown. The interface 124 may be configured to depict one or more broadcasting vehicles 12 within a signal range of the receiving vehicle 14. The interface 124 may be further configured to depict one or more receiving vehicles 14, such as, but not limited to, the home receiving vehicle 14a (shown generally surrounded by a dashed oval outline 25) whose occupant is receiving the broadcasted services advertised using the DSRC network.

In one example, the interface 124 may be configured to depict a map representation of a geographic position of the one or more broadcasting vehicles 12 in reference to the home receiving vehicle 14a. In another example, the interface 124 may be configured to depict a vehicle type of the broadcasting and the receiving vehicles 12, 14, such as, but not limited to, a semi-trailer truck, a pick-up truck, a sports utility vehicle (SUV), a compact vehicle, and so on. In still another example, the interface 124 may be configured to depict relevant information associated with the one or more broadcasting and receiving vehicles 12, 14, such as, but not limited to, display credentials, e.g., username, pseudonym, and so on, broadcasting range, and so on.

The interface 124 may be further configured to depict the selected broadcasting vehicle 12a (shown generally surrounded by a solid oval outline 27) in response to detecting a user selection, e.g., a user selection made using a touch screen of at least one of the interface 26b and the PCD interface 20b. The interface 124 may also be configured to depict one or more selection menus 126 associated with one or more advertised services broadcasted by the selected broadcasting vehicle 12a.

Figure 11:
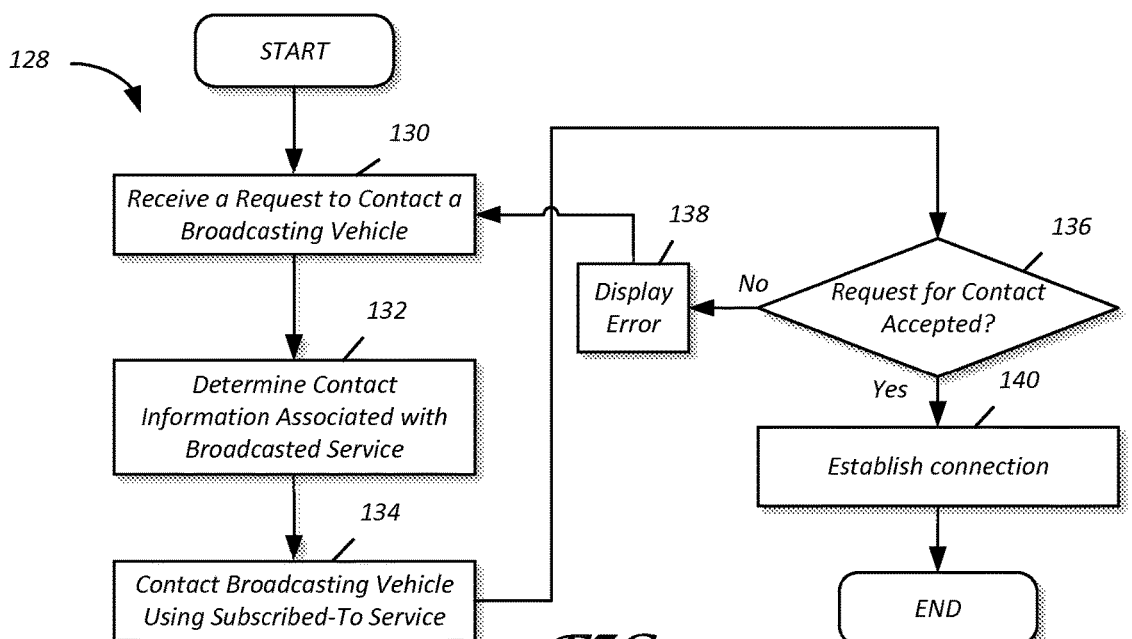
FIG. 11 is a flowchart illustrating an algorithm for contacting a broadcasting vehicle using a subscribed-to service.

In reference to FIG. 11, a control strategy 128 for contacting the broadcasting vehicle 12 using the broadcasted service is shown. The control strategy 128 may begin at block 130 where the controller 22b of the receiving vehicle 14 receives a request to contact the broadcasting vehicle 12 using a subscribed-to broadcasted service. In one example, the controller 22b may receive a request to contact the broadcasting vehicle 12a in response to a user selection made using a touch screen of at least one of the interface 26b and the PCD interface 20b, e.g., the interface 124.

At block 132 the controller 22b determines contact information associated with the subscribed-to broadcasted service. In one example, the controller 22b decrypts a cellular phone number associated with calling the selected broadcasted vehicle 12a. At block 136 the controller 22b contacts the selected broadcasting vehicle 12a using the subscribed-to broadcasted service.

At block 136 the controller 22b determines whether the request for contact has been accepted at the selected broadcasting vehicle 12a. The controller 22b displays an error at block 138 in response to determining that the request for contact using the broadcasted service has been rejected. At this point the control strategy 128 may return to block 130 where the controller 22b receives a request to contact the broadcasting vehicle 12.

At block 140 the controller 22b establishes a connection with the selected broadcasting vehicle 12a using the broadcasted service in response to determining that the request for contact has been accepted. At this point the control strategy 128 may end. In some embodiments the control strategy 128 as described in reference to FIG. 11 may be repeated in response to receiving a request to contact the broadcasting vehicle 12 or in response to receiving a different request or notification.

Figure 12:
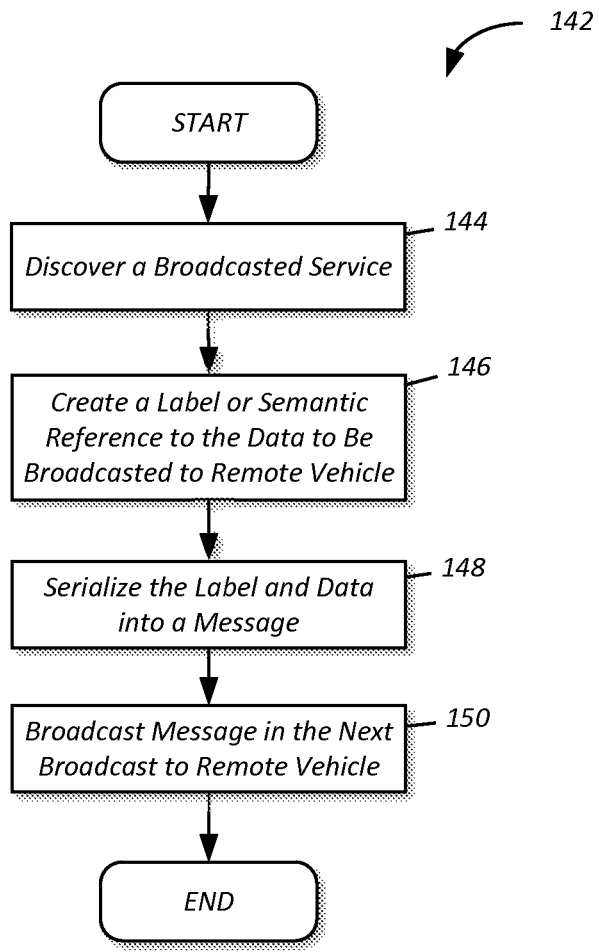
FIG. 12 is a flowchart illustrating an algorithm for broadcasting a discovered broadcasted service to a remote receiving vehicle.

In reference to FIG. 12, a control strategy 142 for broadcasting a discovered service for discovery by one or more remote receiving vehicles 14 is illustrated. The control strategy 142 may begin at block 144 where the controller 22b of the receiving vehicle 14 discovers a service broadcasted by the broadcasting vehicle 12.

At block 146 the controller 22b creates a label or semantic reference to the discovered service data to be broadcasted for discovery by the remote receiving vehicle 14. In one example, the controller 22b may determine whether an update needs to be made to a display of broadcasting and receiving vehicles depicted on at least one of the interface 26b and the PCD interface 20b prior to creating a label or semantic to the received broadcasted service data. As described in reference to FIG. 9, the controller 22b may determine that an update is needed in response to, for example, discovering or stopping to discover the broadcasted service from at least one of the broadcasting vehicles 12.

In one example, the controller 22a of the broadcasting vehicle 12 may broadcast or stop broadcasting a service in response to determining that a change occurred in a relevant parameter, such as, but not limited to, receiving a notification from the controller 22a of the broadcasting vehicle indicating a change of a geographic location of the broadcasting vehicle 12, a connection of one or more new broadcasting PCDs 18a, a change in occupant position of a currently connected PCD 18a, a change in broadcasted service selection of a currently connected PCD 18a, and so on.

In another example, the controller 22b may determine that display update is needed in response to stopping to discover a broadcasted service from at least one broadcasting vehicle 12, such as, but not limited to, when the broadcasting vehicle 12 stopped broadcasting a service, the broadcasting vehicle 12 is no longer within a signal range of the receiving vehicle 14, and so on.

The controller 22b may transmit a notification to the at least one of the interfaces 26b, 20b indicating that an update is needed to at least one broadcasting vehicle, such as, but not limited to, deleting, updating geographic location, or creating a new object.

At block 148, the controller 22b serializes, or otherwise forms digitized signals, the label and the update data to be broadcasted for discovery by one or more remote receiving vehicles 14. The controller 22b at block 150 broadcasts the serialized message via the DSRC network for discovery by the one or more remote receiving vehicles 14.

At this point the control strategy 142 may end. In some embodiments, the control strategy 142 as described in reference to FIG. 12 may be repeated in response to determining that a display update is needed or in response to another determination, request, or notification.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
a controller programmed to, responsive to discovering, without first establishing a connection with a remote vehicle, a service broadcasted by the remote vehicle indicating that communication with the remote vehicle using the service is available, confirm that a unique identifier of the service corresponds to a service identifier of a subscribed-to service, wherein the subscribed-to service is selected by an occupant in the vehicle, and upon receiving input to invoke the subscribed-to service, contact the remote vehicle using the subscribed-to service.

2. The system of claim 1, wherein the service broadcasted is a short message service (SMS), a multimedia messaging service (MMS), or a cellular call service.

3. The system of claim 1, wherein the service broadcasted is selected and made available by an occupant in the remote vehicle.

4. The system of claim 3, wherein the service broadcasted is selected from a plurality of services associated with a position of the occupant in the remote vehicle.

5. The system of claim 1, wherein the subscribed-to service selection originates from a personal communication device (PCD) in communication with a telematics system of the vehicle.

6. The system of claim 1, wherein the service broadcasted originates from a personal communication device (PCD) in communication with a telematics system of the remote vehicle and wherein the controller is further programmed to, in response to the input, contact the PCD using the subscribed-to service.

7. The system of claim 1, wherein the input to invoke the subscribed-to service originates from a receiving personal communication device (PCD) in communication with a telematics system of the vehicle.

8. A communication method for a vehicle comprising:
in response to discovering, without first establishing a connection with a remote vehicle, a service broadcasted by the remote vehicle indicating that communication with the remote vehicle using the service is available, confirming that a unique identifier of the service corresponds to a service identifier of a subscribed-to service, wherein the subscribed-to service is selected by an occupant of the vehicle, and upon receiving input to invoke the subscribed-to service, contacting the remote vehicle using the subscribed-to service.

9. The method of claim 8, wherein the service broadcasted is a short message service (SMS), a multimedia messaging service (MMS), or a cellular call service.

10. The method of claim 8, wherein the service broadcasted is selected and made available by an occupant in the remote vehicle.

11. The method of claim 10, wherein the service broadcasted is selected from a plurality of services associated with a position of the occupant in the remote vehicle.

12. The method of claim 8, wherein the subscribed-to service selection originates from a personal communication device (PCD) in communication with a telematics system of the vehicle.

13. The method of claim 8, wherein the service broadcasted originates from a personal communication device (PCD) in communication with a telematics system of the remote vehicle and further comprising, in response to the input, contacting the PCD using the subscribed-to service.

14. The method of claim 8, wherein the input to invoke the subscribed-to service originates from a receiving personal communication device (PCD) in communication with a telematics system of the vehicle.

15. A communication system for a vehicle comprising:
a controller programmed to
discover, via a dedicated short-range communication (DSRC) network, a broadcasted service advertised by a remote vehicle indicating that communication with the remote vehicle using the service is available,
confirm that a unique identifier of the service corresponds to a service identifier of a subscribed-to service, wherein the subscribed-to service is selected by an occupant in the vehicle, and
upon receiving input invoking the subscribed-to service, contact the remote vehicle using the subscribed-to service.

16. The system of claim 15, wherein the input invoking the subscribed-to service originates from a receiving personal communication device (PCD) in communication with a telematics system of the vehicle.

17. The system of claim 1, wherein the service is an online gaming service.

18. The method of claim 8, wherein the service is an online gaming service.

\* \* \* \* \*